US010483500B2

(12) United States Patent
Jin et al.

(10) Patent No.: US 10,483,500 B2
(45) Date of Patent: Nov. 19, 2019

(54) BATTERY MODULE AND BATTERY PACK INCLUDING SAME

(71) Applicant: LG CHEM, LTD., Seoul (KR)

(72) Inventors: Hee-Jun Jin, Daejeon (KR); Se-Won Kim, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 149 days.

(21) Appl. No.: 15/569,646

(22) PCT Filed: Jun. 28, 2016

(86) PCT No.: PCT/KR2016/006914
§ 371 (c)(1),
(2) Date: Oct. 26, 2017

(87) PCT Pub. No.: WO2017/065384
PCT Pub. Date: Apr. 20, 2017

(65) Prior Publication Data
US 2018/0108881 A1    Apr. 19, 2018

(30) Foreign Application Priority Data

Oct. 14, 2015 (KR) .................. 10-2015-0143625

(51) Int. Cl.
*H01M 2/02* (2006.01)
*H01M 10/613* (2014.01)
(Continued)

(52) U.S. Cl.
CPC ....... *H01M 2/0212* (2013.01); *H01M 2/1077* (2013.01); *H01M 10/613* (2015.04);
(Continued)

(58) Field of Classification Search
None
See application file for complete search history.

(56) References Cited

U.S. PATENT DOCUMENTS

| | | | |
|---|---|---|---|
| 2009/0017365 A1 | 1/2009 | Miyahisa et al. | |
| 2011/0059347 A1 | 3/2011 | Lee et al. | |
| 2015/0037661 A1 | 2/2015 | Lee et al. | |

FOREIGN PATENT DOCUMENTS

| | | |
|---|---|---|
| EP | 2768045 A1 | 8/2014 |
| JP | 11-111250 A | 4/1999 |

(Continued)

OTHER PUBLICATIONS

International Search Report for PCT/KR2016/006914 (PCT/ISA/210) dated Oct. 21, 2016.

*Primary Examiner* — Karie O'Neill Apicella
(74) *Attorney, Agent, or Firm* — Birch, Stewart, Kolasch & Birch, LLP

(57) ABSTRACT

Provided are a battery module capable of preventing damage of a battery cell in as case when the battery cell is mounted and accommodated in a cell cartridge, and a battery pack including the battery module. The battery module according to the present disclosure includes a plurality of battery cells, at least one cell cartridge configured to guide stacking of the plurality of battery cells and to mount therein at least one battery cell among the plurality of battery cells, and a sheet member provided between the battery cell and the cell cartridge, and the sheet member is adhered to the battery cell on a surface where the sheet member contacts the battery cell and is adhered to the cell cartridge on a surface where the sheet member contacts the cell cartridge, to fix the battery cell and the cell cartridge to each other via the sheet member.

11 Claims, 7 Drawing Sheets

(51) Int. Cl.
     *H01M 10/625*     (2014.01)
     *H01M 10/6551*     (2014.01)
     *H01M 2/10*     (2006.01)

(52) U.S. Cl.
     CPC ..... *H01M 10/625* (2015.04); *H01M 10/6551* (2015.04); *H01M 2/1083* (2013.01)

(56) References Cited

FOREIGN PATENT DOCUMENTS

| | | | | |
|---|---|---|---|---|
| JP | 2014-157746 A | | 8/2014 | |
| JP | 2015-026424 A | | 2/2015 | |
| JP | 2015026424 A | * | 2/2015 | ............... H01G 2/08 |
| KR | 10-2008-0024108 A | | 3/2008 | |
| KR | 10-1416544 B1 | | 7/2014 | |
| KR | 101416544 B1 | * | 7/2014 | ............. H01M 2/02 |
| KR | 10-1524007 B1 | | 5/2015 | |
| KR | 10-2015-0065964 A | | 6/2015 | |

* cited by examiner

BATTERY MODULE AND BATTERY PACK INCLUDING SAME

TECHNICAL FIELD

The present disclosure relates to a battery module and a battery pack including the battery module, and more particularly, to a battery module including a cell cartridge capable of guiding stacking of battery cells and preventing motion of the battery cells, and a battery pack including the battery module. The present application claims priority to Korean Patent Application No. 10-2015-0143625 filed on Oct. 14, 2015 in the Republic of Korea, the disclosures of which are incorporated herein by reference.

BACKGROUND ART

A secondary battery easily applicable to various groups of products and having high energy density characteristics is commonly used not only in a portable device but also in an electric vehicle (EV) or a hybrid electric vehicle (HEV) which is driven by an electrical energy source. The secondary battery may not only greatly reduce use of fossil fuel but also produce no by-product after using energy, and thus is regarded as a new environment-friendly energy source capable of increasing energy efficiency.

Currently broadly used secondary batteries include a lithium ion battery, a lithium polymer battery, a nickel cadmium battery, a nickel hydrogen battery, a nickel zinc battery, etc. An operating voltage of a unit secondary battery cell, i.e., a unit battery cell, is about 2.5V to 4.2V. Accordingly, if an output voltage higher than the operating voltage is required, a battery pack may be configured by connecting a plurality of battery cells in series. Alternatively, a battery pack may be configured by connecting a plurality of battery cells in parallel, depending on a charge/discharge capacity required by the battery pack. Therefore, the number of battery cells included in the battery pack may be variously set depending on a required output voltage or charge/discharge capacity.

In general, to configure a battery pack by connecting a plurality of battery cells in series or in parallel, a plurality of battery modules each including a plurality of battery cells are configured first and then a battery pack is configured by adding other elements to the battery modules.

A conventional battery module includes at least one cell cartridge configured to mount at least one battery cell therein and capable of guiding stacking of battery cells and of preventing motion of the battery cells. In general, a plurality of cell cartridges are provided to be stacked on one another, and guide stacking of a plurality of battery cells. The conventional battery module, which restrains the battery cell by using the cell cartridge, generally restrains motion of the battery cell by applying pressure in a surface direction of the battery cell.

FIG. 1 is a top view of a conventional cell cartridge 2 combined with battery cells 1, and FIG. 2 is a cross-sectional view taken along line II-II' of FIG. 1.

Referring to FIGS. 1 and 2, the cell cartridge 2 is injection molded to have a form to fix corners of battery cell bodies, and corners of two battery cells 1 are fitted into the cell cartridge 2 to mount and accommodate the battery cells 1 in the cell cartridge 2. As such, in a conventional battery module, when the corners of the battery cells 1 are fitted into the cell cartridge 2, impact or vibration caused in the mounting process may be transferred to the corners of the battery cells 1, and the battery cells 1 may be damaged, for example, electrode assemblies or electrode leads 3 in the battery cells 1 may be broken.

Specifically, FIG. 3 is a magnified view of portion III of FIG. 2. Referring to FIG. 3, in a portion "a", although x-direction motion may be restrained due to contact between a shoulder of the battery cell 1 and the cell cartridge 2, the thickness of a separator in the battery cell 1 may be reduced or a short-circuit may be caused by breakage of an electrode end when the battery cell 1 is continuously pressed.

Furthermore, as shown in a portion "b", since the electrode leads 3 of the two battery cells 1 are welded to each other but bodies of the battery cells 1 are movable in the x direction due to vibration or impact, the electrode leads 3 of the battery cells 1 may be damaged.

In addition, as shown in a portion "c", corners of the battery cells 1 contact an opposite object such as the cell cartridge 2. As such, if the battery cells 1 are swollen during charge/discharge of and between beginning-of-life (BOL) and end-of-life (EOL) stages of the battery cells 1, internal gas pocket regions may not be easily ensured and a short-circuit may be caused by damage of an ultrasonic-welded part in the battery cells 1. If the structure of the cell cartridge 2 is changed in such a manner that the corners of the battery cells 1 do not contact an opposite object such as the cell cartridge 2, the battery cells 1 may not be easily fixed in a length direction thereof.

Therefore, a method of preventing damage of a battery cell when the battery cell is mounted and accommodated in a cell cartridge is required.

DISCLOSURE

Technical Problem

The present disclosure is designed to solve the problems of the related art, and therefore the present disclosure is directed to providing a battery module capable of preventing damage of a battery cell when the battery cell is mounted and accommodated in a cell cartridge, and a battery pack including the battery module.

Technical Solution

In one aspect of the present disclosure, there is provided a battery module including a plurality of battery cells, at least one cell cartridge configured to guide stacking of the plurality of battery cells and to mount therein at least one battery cell among the plurality of battery cells, and a sheet member provided between the battery cell and the cell cartridge, wherein the sheet member is adhered to the battery cell on a surface where the sheet member contacts the battery cell and is adhered to the cell cartridge on a surface where the sheet member contacts the cell cartridge, to fix the battery cell and the cell cartridge to each other via the sheet member.

When the battery cell is mounted in the cell cartridge, at least two corners of the battery cell may have a gap from the cell cartridge.

The cell cartridge may include a first cartridge frame and a second cartridge frame combined to each other to accommodate the battery cell, and the at least two corners of the battery cell may have the gap from at least one of the first and second cartridge frames.

Each of the first and second cartridge frames may accommodate a battery cell, at least two corners of the battery cell accommodated in the first cartridge frame may have the gap from the first cartridge frame in the first cartridge frame, and at least two corners of the battery cell accommodated in the second cartridge frame may have the gap from the second cartridge frame in the second cartridge frame.

Each of the first and second cartridge frames may include an edge frame configured to form edges of the cell cartridge, and a cell container having a depth from the edge frame and configured to accommodate the battery cell, and the at least two corners of the battery cell may be spaced apart from inner walls of the cell container to have the gap in the cell container.

The battery cell may include an electrode assembly, a battery case including a case body configured to accommodate the electrode assembly, and a case sealing portion protruding from the case body, and electrode leads protruding from the case sealing portion of the battery case and connected to the electrode assembly, and the at least two corners of the battery cell may be two corners of the case body in a protruding direction of the electrode leads.

The two corners of the case body may be spaced apart from inner walls of the cell container, which face each other, to have the gap in the cell container.

In this case, the sheet member may be adhered to the battery case of the battery cell by using a double-sided adhesive tape or adhesive agent, and may be adhered to the edge frame of the cell cartridge by using a double-sided adhesive tape or adhesive agent.

The sheet member may absorb pressure generated when the battery cell is swollen, or may electrically insulate the battery cell from another element.

In another aspect of the present disclosure, there is also provided a battery pack including the at least one battery module described above, and a pack case configured to package the at least one battery module.

Advantageous Effects

According to the present disclosure, a sheet member is provided between a cell cartridge and a battery cell and the cell cartridge and the battery cell are fixed to each other via the sheet member. As such, since corners of the battery cell may not be fitted into and pressed by the cell cartridge, the degree of freedom in designing the cell cartridge may be increased and a conventional problem of transferring impact or vibration caused in a mounting process to the corners of the battery cell when the corners of the battery cell are fitted into the cell cartridge may be solved.

In particular, according to the present disclosure, shoulders of the battery cell do not directly contact the cell cartridge. As such, a problem of reducing the thickness of a separator in the battery cell or of causing a short-circuit by breakage of an electrode end when the battery cell is continuously pressed may be fundamentally prevented.

Even when two battery cells are accommodated in one cell cartridge, since each battery cell is fixed to the cell cartridge via a sheet member, relative motion may not be easily caused between the battery cells. As such, even when electrode leads of the two battery cells are welded to each other, damage of the electrode leads due to the relative motion may be prevented.

In addition, since the corners of the battery cell do not contact but have a gap from an opposite object such as the cell cartridge, internal gas pocket regions may be ensured. Furthermore, a short-circuit caused by damage of an ultrasonic-welded part in the battery cell may be completely prevented.

As described above, according to the present disclosure, the cell cartridge may be fixed by using the sheet member and thus may be changed in structure, a problem of transferring impact or vibration caused when the battery cell is fitted into the cell cartridge, to the corners of the battery cell may be prevented, a problem caused when the battery cell is continuously pressed may be solved, and gas pocket regions may be ensured. As such, a battery module capable of preventing damage of a battery cell when the battery cell is mounted and accommodated in a cell cartridge, and a battery pack including the battery module may be provided.

The battery module and the battery pack may easily protect the battery cell against external vibration and thus may be easily applied to, for example, a vehicle which is frequently exposed to external vibration.

DESCRIPTION OF DRAWINGS

The accompanying drawings illustrate a preferred embodiment of the present disclosure and together with the foregoing disclosure, serve to provide further understanding of the technical concept of the present disclosure, and thus, the present disclosure is not construed as being limited to the drawing.

BEST MODE

Hereinafter, preferred embodiments of the present disclosure will be described in detail with reference to the accompanying drawings. It should be understood that the embodiments described herein are exemplarily provided, and the present disclosure may be variously modified differently from the embodiments described below. For a better understanding of the disclosure, the drawings are not illustrated on an actual scale and sizes of some elements can be exaggerated.

Figure 1:
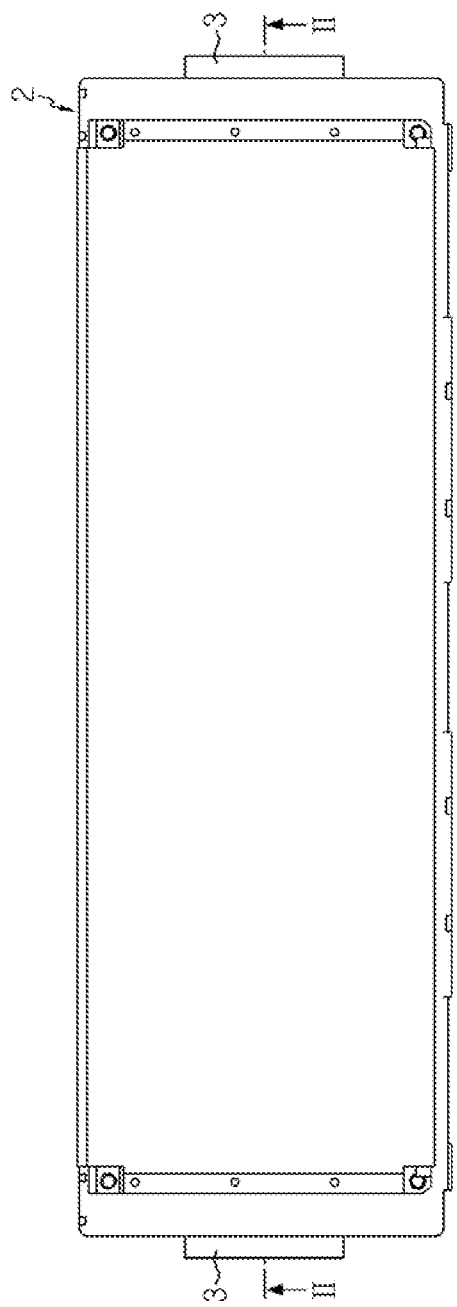
FIG. 1 is a top view of a conventional cell cartridge combined with battery cells.
Figure 2:
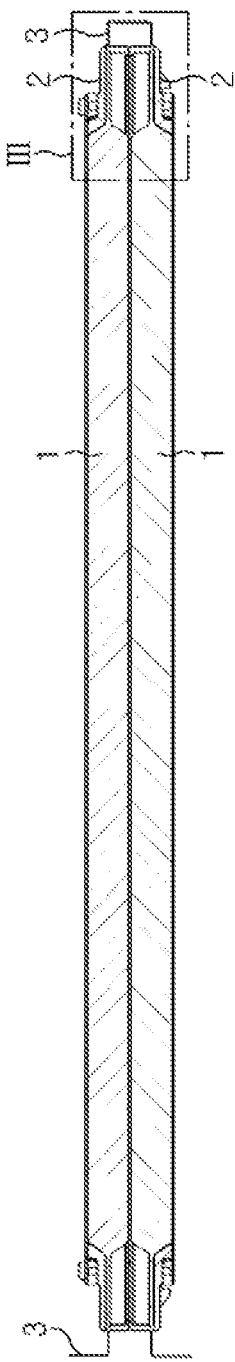
FIG. 2 is a cross-sectional view taken along line II-II' of FIG. 1.
Figure 3:
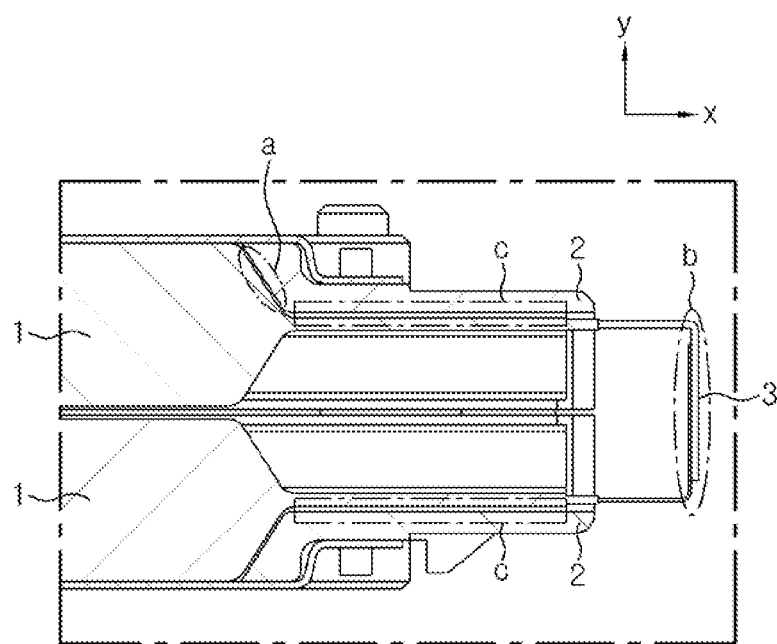
FIG. 3 is a magnified view of portion III of FIG. 2.
Figure 4:
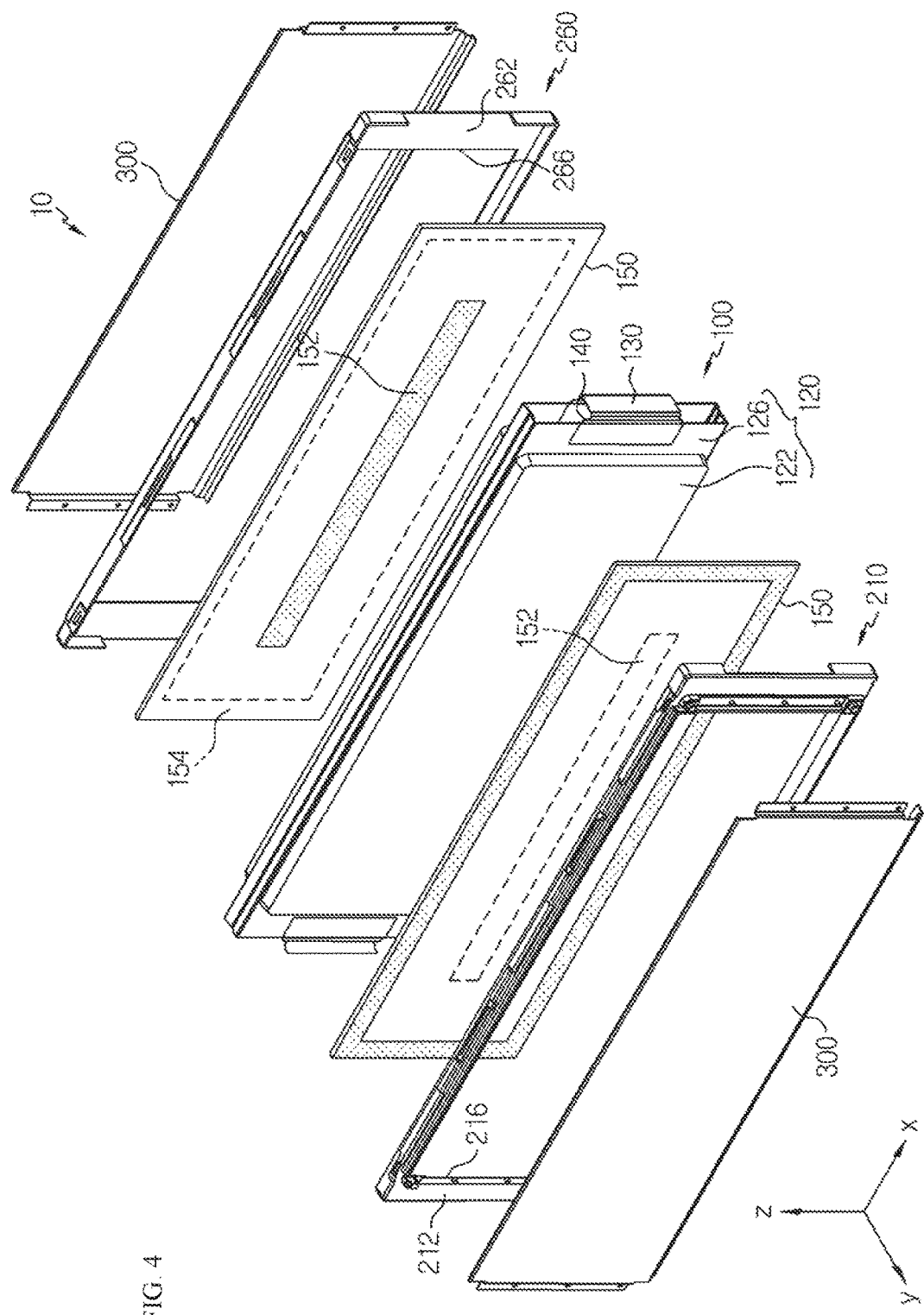
FIG. 4 is an exploded perspective view of a battery module according to an embodiment of the present disclosure.
Figure 5:
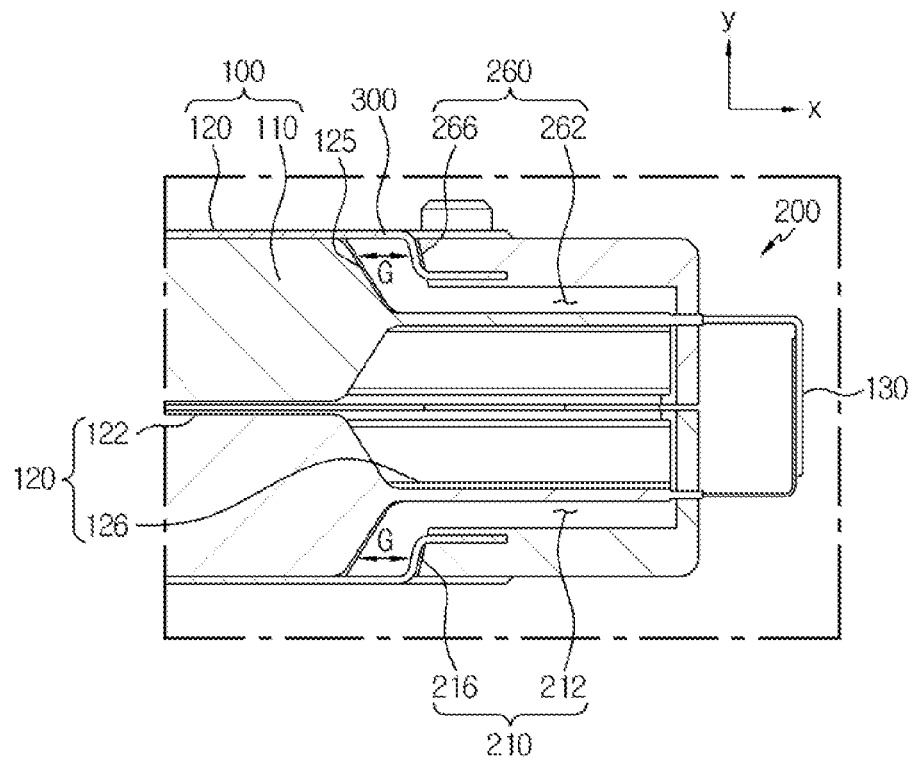
FIG. 5 is a cross-sectional view of a cell cartridge included in the battery module of FIG. 4, at an electrode lead side.

FIG. 4 is an exploded perspective view of a battery module 10 according to an embodiment of the present disclosure. FIG. 5 is a cross-sectional view of a cell cartridge 200 included in the battery module 10 of FIG. 4, at an electrode lead side.

Referring to FIGS. 4 and 5, the battery module 10 may include battery cells 100, sheet members 150, the cell cartridge 200 (210 and 260), and cooling fins 300.

A plurality of battery cells 100 may be provided and may be mounted in the cell cartridge 200 so as to be stacked on one another. In this case, one or more battery cells 100 may be accommodated in one cell cartridge 200.

The sheet members 150 are provided between the battery cells 100 and the cell cartridge 200. The sheet members 150 may be used to absorb pressure generated when the battery cells 100 are swollen. For example, the sheet members 150 may be elastic pads. The elastic pads are not particularly limited to any material as long as the material is capable of exerting elastic pressing force when the battery cells 100 are swollen. Preferably, the elastic pads are made of a polymer resin having elastic properties. For example, the elastic pads may be made of rubber or silicon capable of exerting elastic force in terms of material characteristics, or foamed polymer resin capable of exerting elastic force in terms of material structure or form.

The sheet members 150 may electrically insulate the battery cells 100 from another element, e.g., the cooling fins 300 in the current embodiment. For example, the sheet members 150 may be insulating plates or barrier plates made of at least one material selected from the group including polyethylene (PE), polypropylene (PP), polystyrene (PS), polyethylene terephthalate (PET), polyamide (PA or nylon), polyester (PES), polyvinyl chloride (PVC), polyurethane (PU), polycarbonate (PC), polyvinylidene chloride (PVDC or saran), polytetrafluoroethylene (PTFE or Teflon), polyetheretherketone (PEEK or polyketone), and polyetherimide (PEI or Ultem). The sheet members 150 may be made of a paper material. Preferably, the sheet members 150 may be PET sheets, nylon sheets, or PET-nylon sheets.

Although illustrated as an approximately plate-shaped film, the sheet member 150 may also be provided in a frame shape having a hollow center portion or in a shape divided into many sections that are independently applicable to individual locations, depending on the structure thereof.

The sheet members 150 are adhered to the battery cells 100 on surfaces contacting the battery cells 100, and are adhered to the cell cartridge 200 on surfaces contacting the cell cartridge 200. As such, the battery cells 100 and the cell cartridge 200 are fixed to each other via the sheet members 150. That is, the battery cell 100 is fixed by configuring a connection of the cell cartridge 200—the sheet member 150—the battery cell 100. A detailed description thereof will be provided below.

According to the present disclosure, since the sheet members 150 are used to fix the battery cells 100 and the cell cartridge 200 to each other, the cell cartridge 200 does not need to press corners of the battery cells 100 to fix the battery cells 100. As such, the degree of freedom in designing the cell cartridge 200 may be increased and the cell cartridge 200 of various structures may be used.

The above description is merely an example. When the battery cells 100 are accommodated or mounted in the cell cartridge 200, at least two corners of each battery cell 100 may have a gap G from the cell cartridge 200. A detailed description of the above configuration will be provided below.

Each battery cell 100 may include an electrode assembly 110, a battery case 120, electrode leads 130, and sealing tape 140.

The electrode assembly 110 may include a positive plate, a negative plate, and a separator. The electrode assembly 110 is well known and thus a detailed description thereof is not provided herein.

The battery case 120 is used to package the electrode assembly 110, and may be made of a laminated sheet including a resin layer and a metal layer. The battery case 120 may include a case body 122 and a case sealing portion 126.

The case body 122 may accommodate the electrode assembly 110. When the battery cell 100 is mounted in the cell cartridge 200, the case body 122 may be accommodated in a cell container 216 or 266 of the cell cartridge 200, which will be described below. In this case, at least two corners 125 of the case body 122, e.g., two corners 125 of the case body 122 in a protruding direction of the electrode leads 130 (e.g., x-axis direction), which will be described below, may be spaced apart from inner walls of the cell container 216 by a predetermined distance to have the gap G as described above.

Herein, major elements of the battery cell 100, e.g., the electrode assembly 110 and the electrode leads 130 electrically connected to the electrode assembly 110, may be provided inside the two corners 125 of the case body 122. In the current embodiment, since the two corners 125 of the case body 122 are spaced apart from the cell cartridge 200 to have the gap G when the battery cell 100 is mounted in the cell cartridge 200, the battery cell 100 may not be influenced by impact or vibration caused when the battery cell 100 is fitted into the cell cartridge 200. Accordingly, when the battery cell 100 is mounted in the cell cartridge 200, damage of the electrode assembly 110 and the electrode leads 130 in the battery case 120 of the battery cell 100 may be prevented.

The case sealing portion 126 may protrude from the case body 122 and be heat-welded to seal the case body 122 accommodating the electrode assembly 110.

The electrode leads 130 may protrude from the case sealing portion 126 of the battery case 120 and be electrically connected to the electrode assembly 110. A pair of electrode leads 130 may be provided. The electrode leads 130 may be configured as a positive lead and a negative lead, and protrude from two ends of the case sealing portion 126 in a length direction of the battery case 120 (e.g., x-axis direction).

The sealing tape 140 may be provided in a number of pieces corresponding to the number of the electrode leads 130, and may prevent a short-circuit between the battery case 120 and the electrode leads 130 and enhance sealing force of the case sealing portion 126. As such, a pair of pieces of the sealing tape 140 may be provided to correspond to a pair of electrode leads 130, and may be located between the case sealing portion 126 and the electrode leads 130 in the length direction of the battery case 120.

The cell cartridge 200 may hold one or more battery cells 100 to prevent motion thereof, and may guide assembly of the battery cells 100 stacked on another. In addition, a plurality of cell cartridges 200 may be stacked on one another to guide stacking of a plurality of battery cells 100.

One or more battery cells 100 may be mounted in each of the cell cartridges 200. Specifically, the battery cells 100 may be fitted into and mounted in each cell cartridge 200. Herein, as described above, when each battery cell 100 is mounted in the cell cartridge 200, at least two corners 125 of the battery cell 100, e.g., the two corners 125 of the case body 122, may have the gap G from the cell cartridge 200.

Each cell cartridge 200 may include a first cartridge frame 210 and a second cartridge frame 260.

The cooling fins 300 may be made of a thermally conductive material such as aluminum, and may be provided on the first and second cartridge frames 210 and 260 of each cell cartridge 200 to exchange heat with the battery cells 100. Specifically, the cooling fins 300 may be mounted on a rear surface of the first cartridge frame 210 and a front surface of the second cartridge frame 260, and thus may be provided in front of and at the back of the cell cartridge 200 (e.g., y-axis direction).

The first cartridge frame 210 may mount a battery cell 100 therein to accommodate the battery cell 100. Herein, at least two corners 125 of the battery cell 100 accommodated in the first cartridge frame 210, e.g., the two corners 125 of the case body 122 of the battery case 120, may have the gap G from inner walls of the first cartridge frame 210 in the first cartridge frame 210.

The first cartridge frame 210 may include an edge frame 212 and the cell container 216.

The edge frame 212 may form edges of the cell cartridge 200. When the battery cell 100 is mounted in the cell cartridge 200, the electrode leads 130 of the battery cell 100 may be provided on the edge frame 212.

The cell container 216 has a predetermined depth from the edge frame 212, and may accommodate the battery cell 100. Specifically, the cell container 216 may accommodate the case body 122 of the battery case 120 of the battery cell 100, which is provided below the case sealing portion 126 in the cell cartridge 200. In this case, the two corners 125 in a length direction of the case body 122 accommodated in the cell container 216 (e.g., x-axis direction) may be spaced apart from inner walls of the cell container 216, which face each other, by a predetermined distance to have the gap G in the cell container 216 as described above.

Like the first cartridge frame 210, the second cartridge frame 260 may mount a battery cell 100 therein to accommodate the battery cell 100. Herein, at least two corners 125 of the battery cell 100 accommodated in the second cartridge frame 260, e.g., the two corners 125 of the case body 122 of the battery case 120, may have the gap G from inner walls of the second cartridge frame 260 in the second cartridge frame 260.

The second cartridge frame 260 may be combined with the first cartridge frame 210 to form the cell cartridge 200. As such, two battery cells 100 may be accommodated in one cell cartridge 200.

Like the first cartridge frame 210, the second cartridge frame 260 may include an edge frame 262 and the cell container 266.

Like the edge frame 212 of the first cartridge frame 210, the edge frame 262 may form edges of the cell cartridge 200. Like the edge frame 212 of the first cartridge frame 210, when the battery cell 100 is mounted in the cell cartridge 200, the electrode leads 130 of the battery cell 100 may be provided on the edge frame 262.

Like the cell container 216 of the first cartridge frame 210, the cell container 266 may accommodate the battery cell 100. Specifically, the cell container 266 may accommodate the case body 122 of the battery case 120 of the battery cell 100, which is provided above the case sealing portion 126 in the cell cartridge 200. In this case, the two corners 125 in a length direction of the case body 122 accommodated in the cell container 266 may be spaced apart from inner walls of the cell container 266, which face each other, by a predetermined distance to have the gap G in the cell container 266 as described above.

In this configuration, each sheet member 150 may be adhered to the battery case 120 (particularly, the case body 122) of the battery cell 100 by using a double-sided adhesive tape or adhesive agent 152, and may be adhered to the edge frame 212 or 262 of the cell cartridge 200 by using a double-sided adhesive tape or adhesive agent 154.

By fixing the battery cells 100 to the sheet members 150 attached to the cell cartridge 200 by using the double-sided adhesive tape or adhesive agent 152 and 154, relative motion therebetween may be suppressed. In addition, by partially applying the double-sided adhesive tape or adhesive agent 152 and 154, costs may be reduced and processability may be ensured (for example, an air layer caused in a double-sided adhesive tape or adhesive agent during a process may be reduced).

FIGS. 6 to 10 show various examples about how to adhere each sheet member 150.

Figure 6:
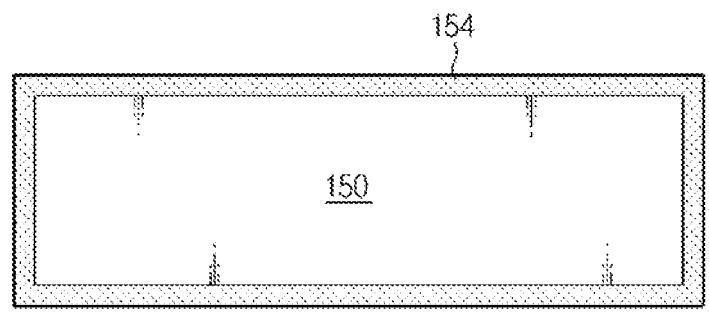
FIGS. 6 to 10 show various examples about how to adhere each sheet member.

FIG. 6 shows a front surface of the sheet member 150, i.e., a surface contacting the cell cartridge 200. To be adhered to the cell cartridge 200 on the surface contacting the cell cartridge 200, the sheet member 150 may include a double-sided adhesive tape or adhesive agent 154 at a location corresponding to the edge frame 212 or 262.

Figure 7:
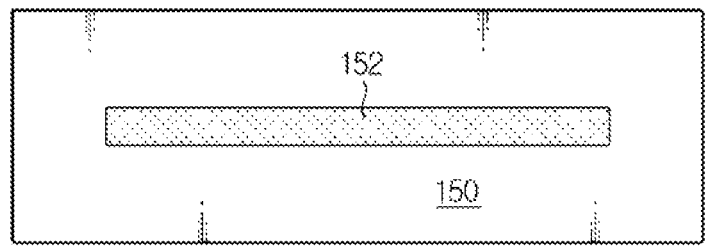
Figure 8:
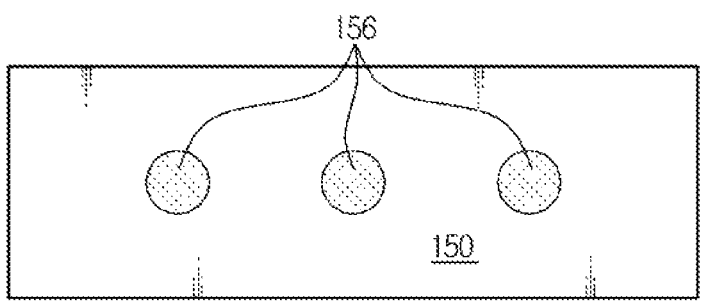

FIGS. 7 and 8 show a rear surface of the sheet member 150, i.e., a surface contacting the battery cell 100.

Referring to FIG. 7, to be adhered to the battery cell 100 on the surface contacting the battery cell 100, the sheet member 150 may include a strip-shaped double-sided adhesive tape or adhesive agent 152 at an almost middle part of the battery case 120 (particularly, the case body 122) of the battery cell 100.

In addition to the illustrated form, the strip-shaped double-sided adhesive tape or adhesive agent 152 may be variously modified. For example, the double-sided adhesive tape or adhesive agent 152 may be provided as two or more parallel strips spaced apart from each other by a predetermined distance. The double-sided adhesive tape or adhesive agent 152 may be provided along a length direction of the sheet member 150, or a width direction of the sheet member 150 (e.g., z-axis direction). Alternatively, two or more strips of the double-sided adhesive tape or adhesive agent 152 may be provided in horizontal and vertical directions to cross each other.

Referring to FIG. 8, to be adhered to the battery cell 100 on the surface contacting the battery cell 100, the sheet member 150 may include isolated pieces of a double-sided adhesive tape or adhesive agent 156 at an almost middle part of the battery case 120 (particularly, the case body 122) of the battery cell 100. Although a circular shape is illustrated, the double-sided adhesive tape or adhesive agent 156 may also have a polygonal shape such as a rectangular shape. Although provided along a length direction of the sheet member 150 in FIG. 8, the isolated pieces of the double-sided adhesive tape or adhesive agent 156 may also be provided along a width direction of the sheet member 150 or provided in a matrix shape.

Since the double-sided adhesive tape or adhesive agent 154 for fixing the cell cartridge 200 is provided on the front surface of the sheet member 150 and the double-sided adhesive tape or adhesive agent 152 or 156 for fixing the battery cell 100 is provided on the rear surface of the sheet member 150 as described above, the sheet member 150 may fix the battery cell 100 and the cell cartridge 200 to each other and may absorb pressure generated when the battery cell 100 is swollen or electrically insulate the battery cell 100 from another element.

In addition to the above examples in which the double-sided adhesive tape or adhesive agent 154 for fixing the cell cartridge 200 is provided on the front surface of the sheet member 150 and the double-sided adhesive tape or adhesive agent 152 or 156 for fixing the battery cell 100 is provided on the rear surface of the sheet member 150, various other examples may also be present.

Figure 9:
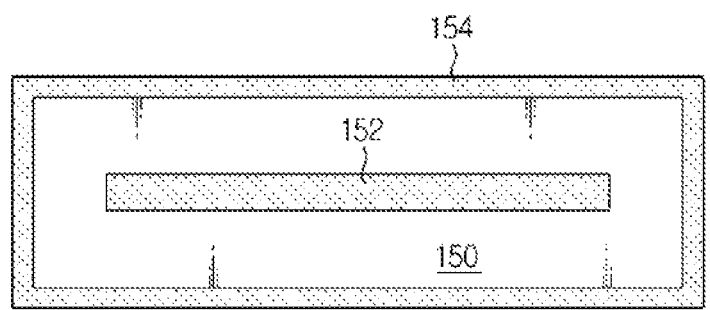
Figure 10:
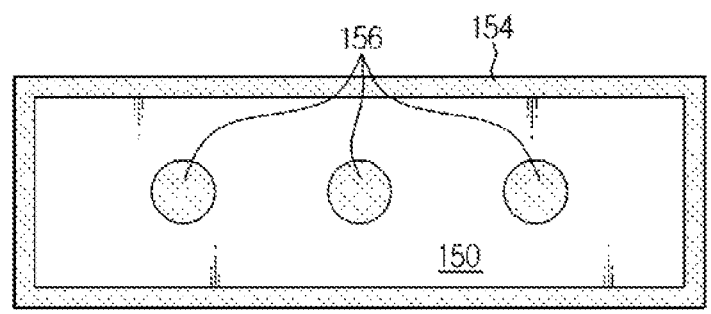

FIGS. 9 and 10 show examples in which the double-sided adhesive tape or adhesive agent 154 for fixing the cell cartridge 200 and the double-sided adhesive tape or adhesive agent 152 or 156 for fixing the battery cell 100 are both provided on one or two surfaces of the sheet member 150.

As described above, the battery module 10 according to the present disclosure may adhere and fix the battery cell 100 (particularly, the battery case 120 of the battery cell 100) to the sheet member 150 attached to the cell cartridge 200 by using the double-sided adhesive tape or adhesive agent 152, 154, and 156. By using the double-sided adhesive tape or adhesive agent 152 or 156 to fix a large surface of the battery cell 100, relative motion between the battery cells 100 may be suppressed. Accordingly, the sheet member 150 may be used to ensure insulation and to protect the battery cell 100 from vibration and impact based on the battery cell fixing structure.

Although al almost plate-shaped film is illustrated, the sheet member 150 may also be provided in a frame shape having a hollow center, depending on the structure thereof. In this case, the sheet member 150 may include a double-sided adhesive tape or adhesive agent at appropriate locations to fix the cell cartridge 200 and the battery cell 100 to front and rear surfaces of the frame shape.

As described above, the battery cell 100 and the cell cartridge 200 may be fixed to each other by using the sheet member 150 according to various designs.

Referring back to FIG. 5, in the present disclosure, shoulders of the battery cells 100 do not directly contact the cell cartridge 200. Even when the shoulders of the battery cells 100 do not directly contact the cell cartridge 200, the battery cells 100 and the cell cartridge 200 are fixed to each other via sheet members and thus x-direction motion may be restrained. Since the shoulders of the battery cells 100 do not directly contact the cell cartridge 200, a problem of reducing the thickness of separators in the battery cells 100 or of causing a short-circuit by breakage of an electrode end when the battery cells 100 are continuously pressed may be fundamentally prevented.

Since an upper battery cell 100 is fixed to the second cartridge frame 260 via a sheet member and a lower battery cell 100 is fixed to the first cartridge frame 210 via a sheet member, the battery cells 100 do not move in the x direction due to vibration or impact. Accordingly, even when the electrode leads 130 of the battery cells 100 are welded to each other, damage of the electrode leads 130 of the battery cells 100 may be prevented.

In addition, since corners of the battery cells 100 do not contact but have the gap G from an opposite object such as the cell cartridge 200, internal gas pocket regions may be ensured. Furthermore, a short-circuit caused by damage of an ultrasonic-welded part in the battery cells 100 may be completely prevented.

As described above, in the battery module 10 according to the current embodiment, since the cell cartridge 200 may be fixed by using the sheet members 150 and thus may be changed in structure and at least two corners 125 of each battery cell 100 including the electrode assembly 110 and the electrode leads 130 may be spaced apart from inner walls of the cell container 216 or 266 of the cell cartridge 200 to have the gap G when the battery cell 100 is mounted and accommodated in the cell cartridge 200, impact or vibration caused in the mounting process may not be transferred to the corners 125 of the battery cell 100, a problem caused when the battery cell 100 accommodated in the cell cartridge 200 is continuously pressed, and gas pocket regions may be ensured.

Accordingly, the battery module 10 according to the current embodiment may prevent breakage of the electrode assembly 110 and the electrode leads 130 in the battery cell 100 when the battery cell 100 is mounted in the cell cartridge 200, thereby preventing damage of the battery cell 100.

Figure 11:
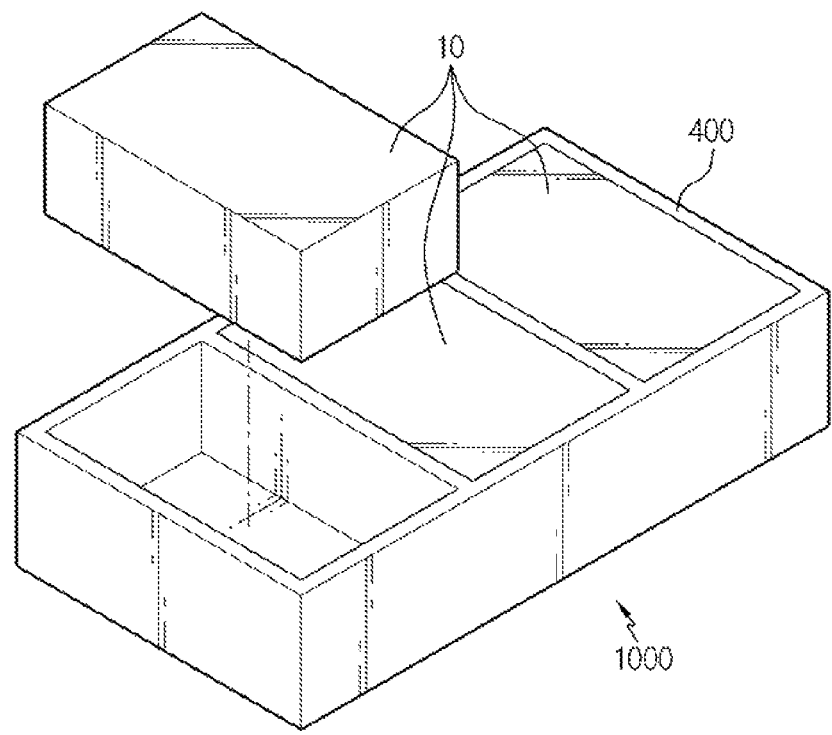
FIG. 11 is a perspective view of a battery pack according to an embodiment of the present disclosure.

FIG. 11 is a perspective view of a battery pack 1000 according to an embodiment of the present disclosure.

Referring to FIG. 11, the battery pack 1000 may include one or more battery modules 10 according to the previous embodiment, and a pack case 400 for packaging the battery modules 10.

By using the sheet members 150, motion of the battery cells 100 in the cell cartridge 200 may be suppressed, damage of parts may be prevented, and thus vibration characteristics may be improved.

The battery pack 1000 may be included in a vehicle as an energy source. For example, the battery pack 1000 may be included in an electric vehicle (EV), a hybrid electric vehicle (HEV), or another type of vehicle capable of using the battery pack 1000 as an energy source. In addition to the vehicle, the battery pack 1000 may also be included in a device, system, tool, or equipment, e.g., an energy storage system using a secondary battery.

As described above, since the battery pack 1000 according to the current embodiment and a vehicle, device, system, tool, or equipment including the battery pack 1000 includes the above-described battery module 10, the battery pack 1000 and a vehicle having all advantages of the battery module 10 may be implemented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:
    a plurality of battery cells;
    at least one cell cartridge configured to guide stacking of the plurality of battery cells and to mount therein at least one battery cell among the plurality of battery cells; and
    a sheet member provided between the battery cell and the cell cartridge,
    wherein the sheet member is adhered with a first double sided adhesive tape or adhesive agent to the battery cell on a surface where the sheet member contacts the battery cell and is adhered with a second double sided adhesive tape or adhesive agent to the cell cartridge on a surface where the sheet member contacts the cell cartridge, to fix the battery cell and the cell cartridge to each other via the sheet member.

2. The battery module of claim 1, wherein, when the battery cell is mounted in the cell cartridge, at least two corners of the battery cell have a gap from the cell cartridge.

3. The battery module of claim 2, wherein the cell cartridge comprises a first cartridge frame and a second cartridge frame combined to each other to accommodate the battery cell, and
    wherein the at least two corners of the battery cell have the gap from at least one of the first and second cartridge frames.

4. The battery module of claim 3, wherein each of the first and second cartridge frames accommodates a battery cell,
    wherein at least two corners of the battery cell accommodated in the first cartridge frame have the gap from the first cartridge frame in the first cartridge frame, and
    wherein at least two corners of the battery cell accommodated in the second cartridge frame have the gap from the second cartridge frame in the second cartridge frame.

5. The battery module of claim 4, wherein each of the first and second cartridge frames comprises:

an edge frame configured to form edges of the cell cartridge; and a cell container having a depth from the edge frame and configured to accommodate the battery cell, and wherein the at least two corners of the battery cell are spaced apart from inner walls of the cell container to have the gap in the cell container.

6. The battery module of claim 5, wherein the battery cell comprises:

an electrode assembly;

a battery case including a case body configured to accommodate the electrode assembly, and a case sealing portion protruding from the case body; and electrode leads protruding from the case sealing portion of the battery case and connected to the electrode assembly, and wherein the at least two corners of the battery cell are two corners of the case body in a protruding direction of the electrode leads.

7. The battery module of claim 6, wherein the two corners of the case body are spaced apart from inner walls of the cell container, which face each other, to have the gap in the cell container.

8. The battery module of claim 6, wherein the sheet member is adhered to the battery case of the battery cell by using the first double-sided adhesive tape or adhesive agent, and is adhered to the edge frame of the cell cartridge by using Rail the second double-sided adhesive tape or adhesive agent.

9. The battery module of claim 1, wherein the sheet member absorbs pressure generated when the battery cell is swollen.

10. The battery module of claim 1, wherein the sheet member electrically insulates the battery cell from another element.

11. A battery pack comprising:

the at least one battery module according to claim 1; and a pack case configured to package the at least one battery module.

* * * * *